(12) United States Patent
Kim et al.

(10) Patent No.: US 10,934,404 B2
(45) Date of Patent: Mar. 2, 2021

(54) ACRYL FILM

(71) Applicant: HYOSUNG CHEMICAL CORPORATION, Seoul (KR)

(72) Inventors: Young Soo Kim, Suwon (KR); Kyung Soo Kim, Seoul (KR); Ho Jun Lee, Sejong (KR); Hyun Woo Choi, Seoul (KR); Hyeok Mo Kang, Hanam (KR); Hyun Suk Chung, Yongin (KR); Bong Choon Kim, Suwon (KR); Jong Hyuk Eun, Suwon (KR)

(73) Assignee: HYOSUNG CHEMICAL CORPORATION, Seoul (KR)

( * ) Notice: Subject to any disclaimer, the term of this patent is extended or adjusted under 35 U.S.C. 154(b) by 19 days.

(21) Appl. No.: 16/341,470

(22) PCT Filed: Jun. 18, 2018

(86) PCT No.: PCT/KR2018/006822
§ 371 (c)(1),
(2) Date: Apr. 12, 2019

(87) PCT Pub. No.: WO2019/045236
PCT Pub. Date: Mar. 7, 2019

(65) Prior Publication Data
US 2019/0292339 A1 Sep. 26, 2019

(30) Foreign Application Priority Data
Sep. 4, 2017 (KR) .......................... 10-2017-0112795

(51) Int. Cl.
| | |
|---|---|
| *C08J 5/18* | (2006.01) |
| *C08L 51/04* | (2006.01) |
| *C08L 51/00* | (2006.01) |
| *C08L 33/12* | (2006.01) |

(52) U.S. Cl.
CPC ................. *C08J 5/18* (2013.01); *C08L 51/00* (2013.01); *C08L 51/04* (2013.01); *C08J 2333/12* (2013.01); *C08L 33/12* (2013.01)

(58) Field of Classification Search
CPC ............ C08L 33/12; C08L 51/00–085; C08L 2203/16
See application file for complete search history.

(56) References Cited

U.S. PATENT DOCUMENTS

| | | | |
|---|---|---|---|
| 9,751,999 B2 | 9/2017 | Sasata et al. | |
| 2010/0181702 A1* | 7/2010 | Takebe | C08L 1/14 264/290.2 |
| 2016/0023723 A1 | 1/2016 | Pletz et al. | |

FOREIGN PATENT DOCUMENTS

| | | |
|---|---|---|
| JP | 2007-0100044 A1 | 4/2007 |
| JP | 2013-0028676 A1 | 2/2013 |
| JP | 2014-0228760 A1 | 12/2014 |
| JP | 2014-0240905 A1 | 12/2014 |
| KR | 2009-0059851 B1 | 7/2009 |
| KR | 2011-0030449 A1 | 3/2011 |
| KR | 2012-0041099 B1 | 4/2012 |
| KR | 2015-0061591 A1 | 6/2015 |
| WO | 2009-150926 A1 | 12/2009 |
| WO | 2015-064732 A1 | 5/2015 |
| WO | 2014-0203637 A1 | 2/2017 |

OTHER PUBLICATIONS

WO 2014/203637 A1 machine translation (Dec. 2014).*
International Search Report dated Sep. 18, 2018 for PCT/KR2018/006822.

* cited by examiner

Primary Examiner — Ana L. Woodward

(57) ABSTRACT

The present disclosure is an acryl film formed from a main dope solution including an acryl resin shown in the following formula 1 and CSR particles, and peel strength measured in peeling speed of 0.5 mpm is 20 gf/2 inch or less, tear strength is 6 gf or more, has excellent peel strength, thereby visual stain by thickness unevenness is improved, and having excellent tear strength and good brittleness.

Formula 1

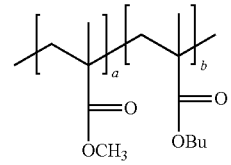

a and b are an integer and 1 or more.
MMA-BMA
wherein, MMA is methyl methacrylate unit and BMA is butyl methacrylate unit.

4 Claims, 1 Drawing Sheet

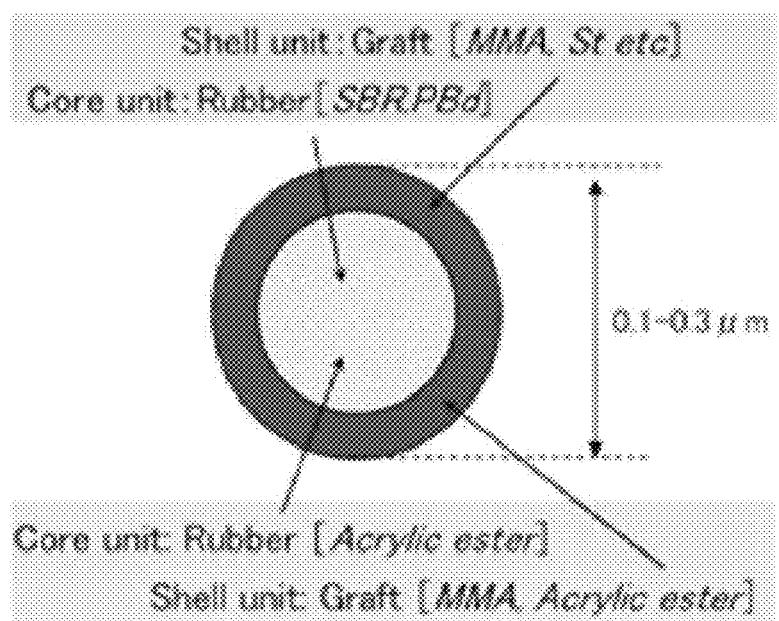

ACRYL FILM

CROSS REFERENCE TO RELATED APPLICATIONS

This application claims priority to Korean Patent Application No. 10-2017-0112795, filed on Sep. 4, 2017. Further, the application is the National Phase application of International Application No. PCT/KR2018/006822, filed on Jun. 18, 2018, which designates the United States. Each of these applications is hereby incorporated by reference in their entirety into the present application.

TECHNICAL FIELD

The present disclosure relates to an acryl film which is easily capable of film forming and film carrying in solvent casting.

BACKGROUND ART

Recently a liquid crystal display (LCD), which has low power consumption, operates in low voltage, and has light weight and thin film, is widely used in information display device such as cell phones, personal digital assistant computer monitors, televisions, etc. The information display device according to use is required reliability in harsh environment. For example, a liquid crystal display for car navigation system is required strict temperature and humidity conditions compared to a monitor for conventional television or personal computer as in car temperature and humidity can become very high. Also, in a liquid crystal display, a polarizer is used to make indication possible and as a liquid crystal display is required strict temperature and humidity conditions, a polarizer comprising it is required to have high durability.

A polarizer conventionally has a laminated structure of transparent protective films to both sides or one side of a polaroid film comprising a polyvinyl alcohol-based resin having dichroism pigment absorbed and orientated. Moreover, conventionally in the protective film triacetyl cellulose (TAC) is widely used, and the protective film is adhered to a polaroid film through an adhesive comprising aqueous solution of a polyvinyl alcohol-based resin. However, a polarizer laminated protective films comprising triacetyl cellulose, due to high water vaper permeability of triacetyl cellulose, when used in high humidity and heat environment for a long time, polaroid performance can decline or peeling between a protective film and a polaroid film can occur. In order to solve the problem, an acrylic resin film having lower water vaper permeability compared to a triacetyl cellulose film was attempted to be used as a protective film of a polarizer.

Existing acrylic protective films have been manufactured by melt casting method, but when manufactured in solvent casting method, there are advantages in environmentally friendly aspects such as thin film, mass-production, resin recycling. The solvent casting method dissolves solvent in an acryl film, presses to T-Die, dries solvent in a belt, and produces a film. Although adding optimized particles, increasing impulse strength, and securing slip property to carry a film are necessary but the process described above is possible. In addition, in this case the particles added should not be melt in solvent or be deformed.

Korean Patent No. 1265007 discloses an adhesion type polarizer which doesn't occur light leakage of an image display unit in use environment change, an acrylic polymer comprising an adhesive layer contains an acrylate monomer unit having a way ring structure in desired amount, and the content is determined according to photoelastic factor X of a transparent protective film, and in case of phase difference of a transparent protective film is changed due to environment change such as heating, an adhesive layer is suggested to be adjust to generate phase difference change of an opposite code of a transparent protective film.

Korean Patent No. 1114354 discloses a protective film for optical member having a photopolymerization acrylic polymer, an antistatic agent, and an adhesive layer comprising a polymerization initiator composition. In a photopolymerization acrylic polymer which introduced a light activator capable of cross-linked reaction by radical generated in an initiator and in a composition comprising a polymerization initiator in a desired ratio, additionally mixed an antistatic agent in proper amount, can omit aging process during hardening, and discloses a protective film capable of simplification of manufacturing process and antistatic property is excellent during peeling or using.

Korean Patent Laid-Open No. 2015-0061591 discloses technology of producing a polarizer protective film, which has excellent adhesion between layers and inhomogeneous tolerance by wind, having a first functional layer formed using a compound comprising cyclic aliphatic hydrocarbon and an ethylene unsaturated double coupler and on top of it a second functional layer formed using a composition comprising urethane acrylate, and by using a fluoro aliphatic contained copolymer having a certain structure on a first functional layer.

Japanese Patent Laid-Open No. 2014-240905 discloses technology to produce a polarizer having excellent adhesion, rework, flatness, and visibility, and film thickness and modulus of elasticity are in certain realm, a protective film A which has an acryl resin as the main component and a phase difference film B which has a cellulose derivative having a substituent with ether combination in a polarizer, a glucose frame as the main component are laminated in order, and both film A and B are connected through an ultraviolet hardening type adhesive.

Meanwhile, when manufacturing an acrylic protective film in solvent casting method, after film peeling, thickness deviation in texture pattern is occurred, and when coating the surface, visual stain defect is caused, thereby improvement in regard of peel strength is in demand. Also, by improving tear strength, a film having better brittleness is in demand.

DISCLOSURE

Technical Problems

The present disclosure is provided to solve the above technical problems of the related art. The present disclosure is directed to providing an acryl film produced in solvent casting method having excellent peel strength and improving defect in visual stain by thickness unevenness and having excellent tear strength and good brittleness.

Technical Solutions

The present disclosure provides an acryl film formed in solvent casting method from a main dope solution comprising an acryl resin shown in the following formula 1 and a core shell rubber (CSR) particle, wherein the acryl resin comprises, with respect to 100 parts by weight of the acryl resin, methyl methacrylate unit of 70 to 98 parts by weight and butyl methacrylate unit of 2 to 30 parts by weight, wherein peel strength measured in peeling speed of 0.5 mpm is 20 gf/2 inch or less and tear strength is 6 gf or more.

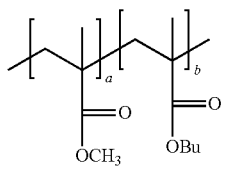

Formula 1 a and b are an integer and 1 or more.
MMA-BMA

Wherein, MMA is methyl methacrylate unit and BMA is butyl methacrylate unit.

In addition, a core shell rubber according to the present disclosure has a core-shell structure, and a core is composed of 1 kind or 2 or more kinds selected in group comprising styrene butadiene rubber, polybutadiene (PBD), and acrylic ester, and a shell as a graft copolymer is composed of 1 kind or 2 or more kinds selected in group comprising MMA, styrene, and acrylic ester, and the diameter is 100 nm to 300 nm, and with respect to film solid of 100 parts by weight, comprising the core shell rubber of 1 to 30 parts by weight is preferable.

Moreover, a molecular weight of the acryl resin of the present disclosure is preferably 50,000 g/mol to 2,500,000 g/mol.

In addition, a solvent of solvent casting is preferably used mixing halogenation hydrocarbon and alcohol.

Also, the present disclosure provides a method of manufacturing an acryl film comprising a step stretching the acryl film formed in solvent casting method from main dope solution comprising an acryl resin shown in the following formula 1 and a core shell rubber, wherein the acryl resin comprises, with respect to 100 parts by weight of the acryl resin, methyl methacrylate unit of 70 to 98 parts by weight and butyl methacrylate unit of 2 to 30 parts by weight, wherein the step comprises a step stretching the acryl film to a stretching ratio of 120% to 140%, at a stretching temperature of 100° C. to 200° C. and at a stretching speed of 30%/min to 90%/min when weight ratio of residual solvent before stretching is 5% to 20%.

Advantageous Effects

The present disclosure provides an acryl film having excellent tear strength and good brittleness which peel strength is improved, thereby there is no defect in visual stain by thickness unevenness of a film.

BRIEF DESCRIPTION OF THE DRAWINGS

FIG. 1 is a view showing a structure of a CSR particle according to an exemplary embodiment of the present disclosure.

DETAILED DESCRIPTION OF EXEMPLARY EMBODIMENTS

Hereinafter, embodiments of the present disclosure will be described in detail. However, the description provided herein is for better understanding of the present disclosure, and the scope of the present disclosure is not limited thereto.

The inventors of the present disclosure have conducted intensive research and various experiments to develop an acryl film excellent in peel strength of a film in solvent casting method and have found that, a molecular weight of an acryl resin in a range of 50,000 to 2,500,000 g/mol, by using an acryl resin comprising certain components, obtaining an acryl film having excellent peel strength, and thus when peeling film thickness is in uniformity, and having excellent tear strength and good brittleness, thereby completing the present disclosure.

In addition, an acryl film according to the present disclosure formed from main dope solution comprising an acryl resin shown in the following formula 1 and CSR particles, and peel strength measured in peeling speed of 0.5 mpm is 20 gf/2 inch or less and tear strength is 6 gf or more.

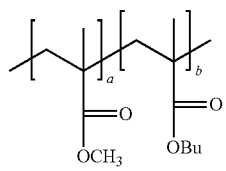

Formula 1 a and b are an integer and 1 or more.
MMA-BMA

Wherein, MMA is methyl methacrylate unit and BMA is butyl methacrylate unit.

First, the description describes an acryl resin of the present disclosure. The acryl resin of the present disclosure is comprises a methyl methacrylate unit and a butyl methacrylate unit, and each of the monomer units is a copolymer resin including a repeating unit form.

When considering optical property, transparency, activity, machinability, and productivity, with respect to the acryl resin of 100 parts by weight, it is preferably comprising methyl methacrylate unit of 70 to 98 parts by weight and butyl methacrylate unit of 2 to 30 parts by weight. When content of methyl methacrylate unit is in the range, excellent phase difference and optical property can be obtained. When the content of methyl methacrylate unit is less than 70 parts by weight, optical performance of a protective film declines, and when it is more than 98 parts by weight, uniformity of a protective film thickness decreases.

In addition, with respect to 100 parts by weight of the acryl resin, a content of the butyl methacrylate unit is preferably 2 to 30 parts by weight. When the content of butyl methacrylate unit is in the range, preferable optical property can be obtained.

In the present disclosure, by adding core-shell rubber particles (CSR) which don't melt and deformed in solvent to the acryl resin, impulse strength of a film is enhanced and film forming and film carrying are facilitated. A core shell rubber comprises a core which is composed of 1 kind or 2 or more kinds selected in group comprising styrene butadiene rubber, polybutadiene (PBD), and acrylic ester, and a shell as a graft copolymer is composed of 1 kind or 2 or more kinds selected in group comprising MMA, styrene, and acrylic ester, Also, a diameter of the core-shell rubber particle (CSR) is preferably 100 to 300 nm. When a diameter of CSR is less than 100 nm, effect of disclosure is not enough, and when it is more than 300 nm, quality of a protective film degrades.

Moreover, the core-shell rubber particle (CSR) is preferably 1 parts by weight or more and less than 30 parts by weight with respect to film solid of 100 parts by weight. When the content of the CSR particles of the present disclosure is in the range, a protective film excellent in both hardness and flexibility can be provided.

In addition, a molecular weight of the acryl resin of the present disclosure is preferably 50,000 to 2,500,000 g/mol. When the molecular weight is less than 50,000 g/mol, productivity of a film decreases, and when the molecular weight is more than 2,500,000 g/mol, molding process is not easy. Also, a glass transition temperature (Tg) of the acryl resin of the present disclosure is preferably 120° C. or more. When the glass transition temperature is less than the range, handling property decreases and which is not preferable.

According to the acryl film of the present disclosure, a film thickness is preferably 10 to 60 μm. When the acryl film thickness is less than 10 μm, phase difference characteristic can't be expressed enough, and when the acryl film thickness is more than 60 μm, it is not proper to use in a polarizer of a thin film.

Moreover, the acryl film of the present disclosure defined in the following equation 1 an in-plane retardation Ro and a thickness direction retardation Rth are in condition of 23° C. and 55% RH and preferably 10 nm or less.

$$Ro=(nx-ny)*d$$

$$Rth=\{(nx+ny)/2-nz\}*d \qquad \text{Equation 1}$$

In the equation 1, d is a film thickness (nm), nx is a maximum refractive index of the film in an in-plane horizontal direction, ny is a maximum refractive index of the film in an in-plane vertical direction of the film, and nz is a maximum refractive index of the film in a thickness direction. When a retardation of the in-plane and the thickness direction is more than 10 nm, as an isotropic optical film, the performance is deteriorated.

In the acryl film of the present disclosure, peel strength measured in peeling speed of 0.5 mpm is preferably 20 gf/2 inch. Peel strength measured in the same method is more preferably 4 gf/2 inch to 17 gf/2 inch. When the peel strength is less than 4 gf/2 inch, defective occurrence rate in process is high, and when it is more than 17 gf/2 inch, uniformity in a film declines. Also, in the acryl film of the present disclosure, tear strength is preferably 6 gf or more.

When the tear strength is less than 6 gf, brittleness of a film fails.

Hereinafter, preferable manufacturing methods of the present disclosure are described in detail.

Preparation of Acryl Resin

In order to prepare an acryl film of the present disclosure, firstly a copolymer resin solution of a methyl methacrylate monomer and a butyl methacrylate monomer is prepared. In a copolymer of the monomers preparing method, a copolymer resin preparing method known in the art such as suspension polymerization, emulsified polymerization, bulk polymerization, or solution polymerization, etc. can be used.

Preparation of Main Dope Solution Including Acryl Resin and Nano Particles

According to the present disclosure, a film is prepared by a solvent casting method (solution film forming method). In the solvent casting method, a film is formed by dissolving an acryl resin among casting solvent and obtaining main dope solution, casting the main dope solution on a supporter, and evaporating solvent, Also, the main dope solution preparation is based on mixing the acryl resin and supplementary additive in casting solvent.

In case of preparing a film in solvent casting method, in order to prepare main dope solution, for solvent, organic solvent is preferable. For organic solvent, halogenated hydrocarbon is preferably used. For halogenation hydrocarbon, there is chlorinated hydrocarbon, methylene chloride, and chloroform, and among them methylene chloride is the most preferably used.

In addition, other organic solvents other than halogenation hydrocarbon may be mixed and used. The organic solvents comprise ester, ketone, ether, alcohol, and hydrocarbon. For ester, methyl formate, ethyl formate, propyl formate, pentyl formate, methyl acylate, ethyl acylate, pentyl acylate, etc. can be used. For ketone, acetone, methyl ethyl ketone, diethyl ketone, diisobutyl ketone, cyclohexanone, methyl cyclohexanone, etc. can be used. For ether, diisopropyl ether, dimethoxy methane, dimethoxy ethane, 1, 4-dioxane, 1, 3-dioxolan, tetrahydrofuran, anisol, phenetole, etc. can be used. For alcohol, methanol, ethanol, 1-propanol, 2-propanol, 1-butanol, 2-butanol, t-butanol, 1-pentanol, 2-pentanol, 2-methyl-2-buthanol, cyclohexanol, 2-fuloroethanol, 2, 2, 2-trifluoroethanol, 2, 2, 3, 3-tetrafluoro-1-propaanol, etc. can be used.

More preferably methylene chloride is used as a main solvent and alcohol can be used as a minor solvent. Specifically, mixed solvent is preferably mixed in the mixture ratio of methylene chloride and alcohol of 80:20 to 95:5 weight ratio. Also, mixed solvent is more preferably mixed in the mixture ratio of methylene chloride and methanol of 85:15.

In the acryl film preparing method, auxiliary additives may be more used. In the main dope solution, in each preparing process, according to use the auxiliary additives such as an ultraviolet light inhibitor, fine particles, an infrared light absorber, a release agent, etc. can be added. Specific types of such the additives are not limited if ordinarily used in the art, and the content is preferably used in the range not declining property of the film. Also, the time to add additive is determined according to types of additive. A process of lastly adding additive in dope preparation may be implemented.

For additive of the present disclosure, core-shell rubber particles (CSR) in MMA material were used, and example of the structure is shown in FIG. 1.

The main dope solution obtained by the method described above may be prepared in room temperature, in high temperature, or in low temperature dissolution method.

Film Formation Process

In solvent casting method of the present disclosure, main dope solution is poured from a nozzle of pressuring die on a metal supporter, leaving for a predetermined time, and a film in semi-drying state is formed. Then the film is peeled from the metal supporter, carried to a drying system, and removed the solvent by drying. Also, the film in drying state is performed a first axis stretching process or a second stretching process. By performing the stretching step, film uniformity and phase difference value of the protective film may increase.

Specifically, the obtained main dope solution casts on a supporter through casting die and forms an acryl sheet. The support serves to evaporate the solvent present in the casting solution to form an acrylic film while transferring the sheet casting solution extruded from the die. The supporter or the surface is composed of metal, and thus it is preferable to bright finish the surface, and for the supporter, a steel belt such as a stainless steel belt, etc. is preferably used. Also, in regard of surface temperature of the metal supporter, if temperature is higher, evaporation of solvent existing in the casting undiluted solution is faster, but if the temperature is too high, there are problems such as foaming of casting undiluted solution or deteriorating flatness, and even though it is different according to solvent, 0 to 75° C. is preferable and 5 to 45° C. is more preferable. For the supporter, a metal supporter in plane conveyer belt form may be used.

Moreover, the acryl sheet formed in the method described above goes through a stretching step in tender, and in pre-heating process, a glass transition temperature (Tg) of acryl flake is 100° C. or more. The acryl film of the present disclosure goes through a stretching step in tender in the condition described above, left and right side ends of the film in which a surface of the film is damaged by a clip or a pin of tender are removed, and the film is prepared through a drying step.

In case of using a tender stretching device, it is preferable to use a device capable of controlling the gripping length of the film from the left and right by the right and left gripping means of the tenter.

In the case of using the tenter stretching device, the stretching operation may be conducted multi-stepwise and it is also preferred to perform biaxial stretching in the casting direction and in the width direction. Further, biaxial stretching may be conducted simultaneously or stepwise. In the case of "stepwise", it is feasible to perform stretching successively in different directions or it is also feasible that stretching in one direction is divided into multiple steps and stretching in a different direction is applied to any of the steps. Simultaneous biaxial-stretching includes stretching in one direction and relaxing tension in the other direction to be shrinked. A stretching ratio of simultaneous biaxial-stretching is preferably from 1.01 to 2.0 fold for both of the width direction and the longitudinal direction.

A drying means generally blows hot air onto the both surfaces of the web, but a heating means by applying microweb in place of wind is also available. However, too rapid drying can easily damage flatness of a completed film.

According to the present disclosure manufactured by the method described above, peel strength measured in peeling speed of 0.5 mpm is 20 gf/2 inch or less, and tear strength is 6 gf or more.

Hereinafter, the present disclosure will be described in detail with reference to the following examples. However, the examples provided herein are for illustrating the present disclosure, and the scope of the present disclosure is not limited thereto.

Example 1

<Step 1> Acryl Resin Preparation

A content of butyl methacrylate unit was 5 parts by weight, and an acryl shown in the following formula 1 was used.

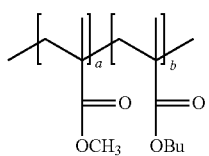

Formula 1 a and b are an integer and 1 or more.

<Step 2> Main Dope Solution Comprising CSR Particles Preparation

A main dope solution comprising methylene chloride of 65.18 parts by weight, methanol of 14.31 parts by weight, the acryl resin of 16.48 parts by weight, CSR (Kaneka Co. acryl type M-210 grade) of 3.69 parts by weight, Tinvuin 928 (BASF Co.) which is an ultraviolet absorber of 0.33 parts by weight, and Silica of 0.01 parts by weight was prepared.

<Step 3> Film Forming Process

Then, the main dope solution was cast on a steel belt using an applicator (width 2 inch), until arrived to constant residual solvent, dried in room temperature, and a film was formed.

Example 2 to 3

An acryl film was manufactured in the same manner as in Example 1, except that an acryl resin of BMA content of an acryl resin is 10 weight % (Example 2) and 15 weight % (Example 3) was used.

Comparative Example 1

An acryl film was manufactured in the same manner as in Example 1, except that CSR was not added.

Comparative Example 2

An acryl film was manufactured in the same manner as in Example 1, except that an acryl resin shown in the following Formula 2 was used.

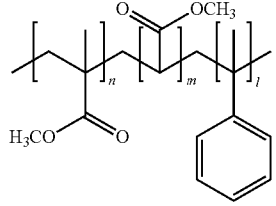

Formula 2

Comparative Example 3

An acryl film was manufactured in the same manner as in Comparative Example 2, except that the CSR was not added.

1. Peel Strength Evaluation

For the films of the Example 1 to 3 and Comparative Example 1 to 3, samples of 50 mm size was prepared, a peel strength was evaluated by forwarding a plate and by using AR-1000 (Chemsultants International Inc.) equipment, the results are shown in Table 1.

2. Phase difference

For the films of the Example 1 to 3 and Comparative Example 1 to 3, by using AxoScan (OPMF-1 Axometrics Co.) optical measurement equipment, in environmental conditions of 23° C. and 55% RH, in wavelength of 590 nm, phase difference value Ro and Rth were measured, and the results are shown in Table 1.

3. Visual Stain Evaluation

For the films of the Example 1 to 3 and Comparative Example 1 to 3, visual stain was evaluated with the naked eye.

4. Tear Strength Evaluation

For the films of the Example 1 to 3 and Comparative Example 1 to 3, by using the following standard and equipment, tear strength was measured, and the results are shown in Table 1.

Test Standard: Elmendorf method (KS M ISO 6383-2: 2010) plastic film/sheet tear resistance measuring method Manufacturer and model name: LabThink Co. SLY-SI model

TABLE 1

| Specimen | Recipe (film solid criteria) resin | CSR (parts by weight) | Peel strength (gf/2 inch) | Phase difference Plane direction (nm) | Thickness direction (nm) | Visual stain | Brittleness Tear strength (gf) |
|---|---|---|---|---|---|---|---|
| Example1 | MMA-BMA (content of BMA 5 parts by weight) | 3.69 | 16 | 1 | 5 | no | 9.2 |
| Example2 | MMA-BMA (content of BMA 10 parts by weight) | 3.69 | 12 | 2 | 7 | no | 9.1 |
| Example3 | MMA-BMA (content of BMA 15 parts by weight) | 3.69 | 6 | 2 | 8 | no | 9.5 |
| Comparative Example 1 | MMA-BMA (content of BMA 5 parts by weight) | 0 | 3 | 2 | 8 | no | 4.3 |
| Comparative Example 2 | General acryl | 3.69 | 70 | 1 | 5 | no | 5.3 |
| Comparative Example 3 | General acryl | 0 | 77 | 5 | 11 | no | 3.5 |

As described in Table 1, when using the acryl resin and CSR particle suggested in the present disclosure, a high quality isotropic optical film having excellent peel strength, and thus there is no visual stain problem, and having excellent tear strength and good brittleness can be manufactured. If a CSR particle is not added, tear strength declines, and if a general acryl resin is used, peel strength is high so it is not good.

The invention claimed is:

1. An acryl film formed in solvent casting method from a main dope solution comprising an acryl resin shown in the following formula 1 and a core shell rubber (CSR) particle,
    wherein the acryl resin comprises, with respect to 100 parts by weight of the acryl resin, methyl methacrylate unit of 85 to 98 parts by weight and butyl methacrylate unit of 2 to 15 parts by weight,
    wherein peel strength measured in peeling speed of 0.5 mpm is 4 to 17 gf/2 inch or less and tear strength is 6 gf or more, and
    wherein the CSR particle has a core-shell two-layer structure, and a core is composed of one or more kinds selected from a styrene butadiene rubber, polybutadiene (PBD), and an acrylic ester polymer, and a shell is a graft copolymer of two or more kinds of monomer units selected from methyl methacrylate, styrene, and acrylic ester, Formula 1

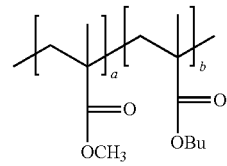

a and b are an integer and 1 or more.

2. The acryl film of claim 1, wherein a diameter of the CSR particle is 100 nm to 300 nm, and the CSR particle constitutes 1 wt % to 30 wt % with respect to 100 wt % of the acryl film.

3. The acryl film of claim 1, wherein a molecular weight of the acryl resin is 50,000 g/mol to 2,500,000 g/mol.

4. The acryl film of claim 1, wherein a solvent of the solvent casting comprises halogenation hydrocarbon and alcohol.

* * * * *